M. A. GARRETT.
CAR COUPLING.
APPLICATION FILED FEB. 24, 1913.

1,107,929. Patented Aug. 18, 1914.

Witness
C. K. Davies.
J. H. Adriaans.

Inventor
M. A. Garrett,
By F. E. Stebbins
Attorney

THE NORRIS PETERS CO., PHOTO-LITHO., WASHINGTON, D. C.

UNITED STATES PATENT OFFICE.

MYERS A. GARRETT, OF CHICAGO, ILLINOIS.

CAR-COUPLING.

1,107,929. Specification of Letters Patent. Patented Aug. 18, 1914.

Application filed February 24, 1913. Serial No. 750,225.

*To all whom it may concern:*

Be it known that I, Myers A. Garrett, a citizen of the United States, residing at Chicago, in the county of Cook and State of Illinois, have invented certain new and useful Improvements in Car-Couplers; and I do hereby declare the following to be a full, clear, and exact description of the invention, such as will enable others skilled in the art to which it appertains to make and use the same.

All car couplers include in their construction as essential elements, the head and shank of the coupler. In actual service these elements are subjected to enormous shocks, which tend to and eventually do, effect the destruction or damage of these parts, so that frequent replacements are necessary, as is well known. These shocks are more destructive on the head than on the shank, so that in most cases the head only is damaged, while the shank remains in normal working condition, and is suitable for a continuation in service. But the fact that the head and shank are formed integrally renders it necessary that the undamaged shank be "scrapped" with the damaged head, thus wasting not only the material and possible service of the shank, but also in many instances, auxiliary parts, as yokes, rivets, etc., are wasted.

The objects of the invention is the provision of a car coupler made in two separable parts, one comprising the head with its attachments and the other the draw bar or shank, said parts being united by a third element, whereby, when the head becomes damaged or broken, another may be substituted without discarding the shank, or vice versa.

By the utilization of a sectional or separable coupler with a uniting element, as hereinafter pointed out, I am enabled to save and re-use the shank and auxiliary parts, where the head is damaged, and vice versa, thus accomplishing the purpose of my invention.

In the accompanying drawings I have illustrated one complete example of the physical embodiment of my invention constructed according to the best mode I have so far devised for the practical application of the principles of my invention.

Figure 1:
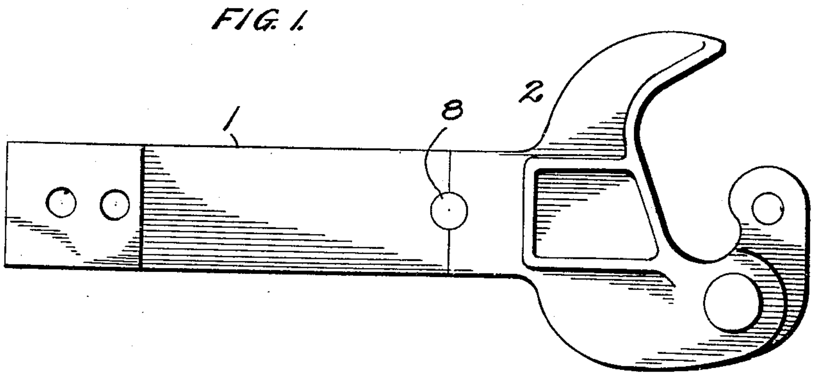
Figure 2:
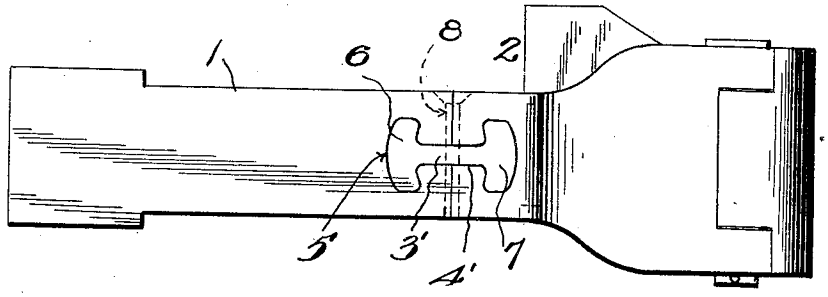
Figure 3:
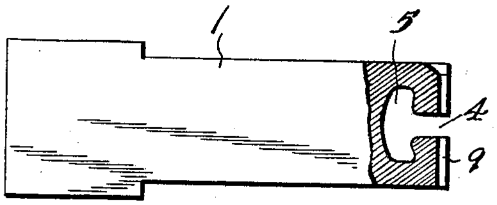
Figure 4:
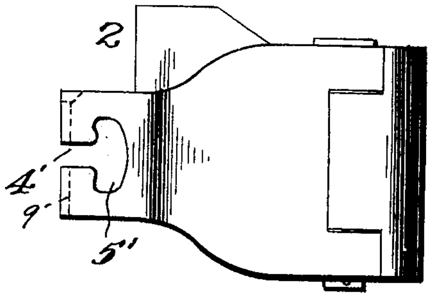
Figure 5:
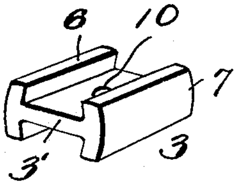
Figure 6:
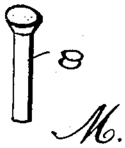

Figure 1 is a top plan view of a car coupler of standard type embodying my invention. Fig. 2 is a side elevation of Fig. 1. Fig. 3 illustrates in side elevation, the shank portion of the coupler, having one end partly broken away for convenience of illustration. Fig. 4 is a view complementary to Fig. 3 illustrating the head portion of the coupler. Fig. 5 is a view in perspective of the uniting element or key for the shank and head portions of the coupler, and Fig. 6 is a perspective view of the securing pin or rivet for the uniting key.

The standard type of coupler illustrated comprises the shank section 1 and the head section 2. These members are adapted to be united and held together by a key, broadly designated as 3, in Fig. 5. The adjoining, solid ends of the shank and head are formed with complementary throats 4 and 4′ respectively, and these throats or contracted slots open into the enlarged respective recesses 5 and 5′ in the shank and head.

As clearly seen in the drawings the two sections 1 and 2 of the coupler are held together by means of the key 3, which when the parts are united, fits with its web 3′ in the throat 4—4′ and its heads 6 and 7 in either of the recesses 5 or 5′, for it will be understood that the throats and recesses in the ends of the adjoining sections are duplicates, and that the key is fashioned in complementary manner. With the adjoining ends of the two sections brought into close juxtaposition, the key may be inserted into the throat and recesses provided therefor, with facility, and when in this position will hold the sections against disconnection. It will be understood that the fit of the parts is sufficiently accurate to provide a rigid and tight joint, and that the sectional coupler thus held together is as stable as a one piece or integral coupler. After the key is inserted into position, a pin, or rivet, 8 may be passed through an opening 9 formed in the complementary faces of the sections 1 and 2, and this pin also passes through an opening 10 in the web 3′ of the key 3. By means of the pin or rivet, lateral displacement of the key is prevented. In the event the head section is broken, for instance, the pin is withdrawn, and after the key has been forced from between the sections, the damaged head is replaced with a perfect one, the key again inserted between the sections, and the pin is again passed through the parts to lock them against lateral displacement of the key.

Having thus fully described my invention, what I claim as new and desire to secure by Letters Patent is:—

1. The combination in a car coupler with a head section and a shank section having locking recesses in their adjoining ends, of a separate key adapted to fit in said recesses and hold the sections together, and means for preventing displacement of the key; the ends of the said sections abutting in frictional contact whereby in buffing strains will be transmitted directly from one section to the other.

2. A separable car coupler comprising sections each formed with a slot and an enlarged recess in their adjoining ends, a key formed with an integral web and pair of heads to fit said slots and recesses, and a locking pin passed through openings in the coupler and key to prevent displacement of the key.

In testimony whereof I affix my signature, in the presence of two witnesses.

MYERS A. GARRETT.

Witnesses:

W. T. Blunt,

R. J. Smaus.

Copies of this patent may be obtained for five cents each, by addressing the "Commissioner of Patents, Washington, D. C."